Patented Jan. 7, 1947

2,413,758

UNITED STATES PATENT OFFICE 2,413,758

PRODUCTION OF SPINNING SOLUTIONS

George H. Fremon, Charleston, W. Va., assignor to Carbide and Carbon Chemicals Corporation, a corporation of New York No Drawing. Application December 27, 1943, Serial No. 515,821

11 Claims. (Cl. 260—32)

The present invention relates to the production of solutions of vinyl resins in volatile solvents for such resins; and more especially it concerns a novel and commercially practicable procedure for making concentrated vinyl resin compositions which are substantially free from solid particles of the resin and from non-solvent diluents, and are capable of being spun in the form of fine filaments.

The invention has especial utility for the preparation of solutions of vinyl resins comprising vinyl halide polymers, which solutions are suitable for use in extruding or otherwise forming artificial fibers, filaments and films, and of solutions of such vinyl resins which are heat-sensitive and hence subject to injury by the heat treatment commonly required in prior processes for rendering the resins soluble to the desired extent in the solvent for the resin.

It often is difficult to make a smooth, homogeneous solution of a vinyl resin in an organic solvent, which satisfies the exacting requirements of spinning and similar operations, even though the complete solubility of the resin in such solvent can be readily demonstrated. Different batches of a difficultly-soluble vinyl resin commonly behave quite differently when attempts are made to dissolve the resin to form a concentrated solution in a given organic solvent. As a result, the task of making smooth, gel-free solutions of these vinyl resins, which do not cause clogging of filters, frequently varies considerably without any apparent reason. In the more troublesome cases, particularly in the preparation of concentrated solutions of vinyl resins, lumps of resin are formed which are of a size out of all proportion to the original particle size of the powdered resin used in making the solution. The formation of such lumps can be avoided to some extent by the use of certain precautions, but in many cases lumps form despite all precautions and introduce serious practical problems.

Heretofore methods have been devised for hastening the dissolution of vinyl resin in organic solvents by first wetting the resin with an organic liquid diluent which has no solvent action on the resin but which penetrates the latter. The wet resin is then mixed with the desired organic solvent to form the solution in the presence of the diluent. Such procedures are not permissible in the case of those resin-solvent systems wherein the vinyl resin has limited solubility in the solvent, since such solutions have very low tolerance for non-solvent diluents.

In preparing concentrated solutions of vinyl resins in acetone or other volatile solvent, suitable for spinning filaments and fibers, it often is necessary to knead the spinning dope for many hours at elevated temperatures to eliminate the lumps. This prolonged heat treatment, in addition to being costly and time-consuming, may have a deleterious effect on certain vinyl resins. The development of spinning compositions from vinyl halide-acrylonitrile copolymers such as those described in the pending application Serial No. 476,616 of E. W. Rugeley, T. A. Feild, Jr., and J. L. Petrokubi, filed February 20, 1943, especially has been hampered by the tendency of such copolymer resins to form gel particles which are particularly difficult to disperse or to filter out. After elimination of the gel particles, however, these spinning solutions produce excellent filaments. Consequently the prevention of gel particle formation during preparation of spinning solutions from these resins is a matter of great practical importance in obtaining superior filaments and yarns. The use of non-solvent penetrants is ruled out by the low tolerance of such spinning solutions for diluents.

The present invention is based in important part upon the discovery that volatile solvents having high solvent capacity for these vinyl resins, but which normally yield solutions containing solid gel particles, can be made to act in the same manner as the inert diluents employed in prior known dissolution processes, such solvents being temporarily relieved of their solvent power for the resin.

This may be accomplished by first chilling such solvent, or a mixture of such solvents, to a low temperature at which the solvent power of the solvent for the vinyl resin is slight, e. g., in most instances to temperatures around 0° C. or below, depending upon the resin and solvent employed, before and during the mixing of the finely-divided resin therewith. The resultant mixture of solid resin and volatile solvent thereafter may have its temperature raised, whereupon the solvent action of the volatile solvent for the resin particles wetted therewith is reasserted, and a concentrated or other solution is formed that is free from gels or other solid particles of the resin.

The process is especially efficacious for the production of clear spinnable solutions in acetone and other solvents for vinyl resins produced by the conjoint polymerization of a vinyl halide with one or more other vinyl compounds such as (1) vinyl esters of aliphatic acids, e. g., vinyl acetate and vinyl butyrate and/or (2) acrylic compounds, such as acrylonitrile, and the methyl, ethyl, isopropyl and isobutyl esters of acrylic and methacrylic acids. Various examples of these vinyl resins are described in the United States Patent No. 2,161,766 of E. W. Rugeley, T. A. Feild, Jr., and J. F. Conlon, and in the aforesaid pending application, Serial No. 476,616 of E. W. Rugeley, T. A. Feild, Jr., and J. L. Petrokubi. Copolymers of styrene and acrylonitrile, after-chlorinated polyvinyl chlorides, and after-chlorinated vinyl chloride-vinyl acetate copolymers likewise exemplify resins that can be effectively treated by the process.

In certain preferred modifications of the invention, a finely divided vinyl resin is mixed with a volatile solvent therefor, such as acetone, which has been chilled to 0° C. or below. The mixture may be effected by any suitable means, such as by mechanically working the mixture in a dough mixer or by means of a light-duty, high-speed mixer of the propeller type. During mixing the temperature of the mixture is maintained within the aforesaid temperature range. The mixture at this stage of the process generally is in the form of a smooth slurry. The temperature of the mixture thereafter is raised to a temperature of at least 20° C., during which the vinyl resin dissolves in the solvent to form a smooth solution free from gel or other solid particles of the resin.

Heretofore a standard procedure for preparing vinyl resin spinning dopes has consisted of mixing the resin with an approximately equal weight of acetone in a suitable mixer, during which the temperature is raised to about 50° C. The mixture of resin and solvent is kneaded until a smooth, clear mass is obtained. Additional acetone then is added to dilute this concentrated solution to the desired consistency and to form a solution that is slowly flowable at around 50° C. In some instances, a period of several hours is required for the initial mixing; and even then the removal of gel particles is not necessarily complete.

In contrast therewith, according to a preferred form of the present invention for producing spinning solutions, all of the vinyl resin and all of the solvent which are desired in the final solution may be intimately mixed at the start of the process. There is no need for any later dilution of the mixture. The solvent is first chilled to a temperature below that which rapid solvation of the resin by the solvent occurs, and usually to a temperature of 0° C. or lower, in any well-known manner, as by means of a brine coil immersed in the solvent, or simply by adding solid carbon dioxide to the solvent. Where the particle size of the resin is of the order of 100 mesh or finer, a simple mixing is all that is necessary. Where coarse lumps of the resin are present, these lumps may be broken by vigorously agitating the low temperature mixture.

The most striking characteristic of the mixture is the apparent absence of any tendency for the resin solvent while at the aforesaid low temperature, to soften, swell or dissolve the resin. Where the vinyl resin and solvent are mixed in proportions sufficient to yield a solution having a vinyl resin concentration of about 20%, the consistency of the mixture at sub-zero temperatures commonly is that of a very thin slurry which requires no heavy-duty mixing apparatus.

Obviously, any volatile solvent for the vinyl resins may be utilized in the process. However, those solvents having good wetting power for the resins, and having boiling points no higher than around 127° C. are preferred. Among solvents useful in the process may be mentioned ketones such as methyl ethyl ketone, acetone, methyl isobutyl ketone, cyclohexanone, isophorone, and mesityl oxide; propylene oxide; chlorinated solvents such as ethylene dichloride and carbon tetrachloride; dioxane; butyl acetate; and mono-nitro-paraffins such as nitroethane and nitropropane.

Table A designates the maximum permissible temperature of certain volatile solvents when preparing solutions in such solvents of certain representative vinyl resins in accordance with the invention:

*Table A*

| Vinyl resin | Solvent | Strength of solution | Maximum mixing temperature |
|---|---|---|---|
| | | Per cent | ° C. |
| A | Acetone | 10–25 | −2 |
| A | Methyl ethyl ketone | 10–25 | −30 |
| A | Acetone containing 15% of ethylene dichloride. | 10–25 | −5 |
| A | Acetone containing 15% of toluene. | 10–25 | −5 |
| A | Ethylene dichloride | 10–25 | −17 |
| B | Acetone | 10–25 | −2 |
| B | Acetone containing 15% of propylene oxide. | 10–25 | −2 |
| C | Acetone | 10–30 | 0 |
| D | ----do---- | 10–30 | 0 |
| E | ----do---- | 10–25 | −5 |

In the table, resin A represents vinyl chloride-vinyl acetate copolymers containing at least 85% of vinyl chloride and having macromolecular weights of at least 15,000; resin B represents vinyl chloride-acrylonitrile copolymers containing from 45% to 80% of the vinyl chloride, and having specific viscosities at 20° C. greater than 0.15; resin C represents acetone-soluble after-chlorinated polyvinyl chloride; resin D represents acetone-soluble after-chlorinated vinyl chloride-vinyl acetate copolymers; and resin E represents acetone-soluble styrene-acrylonitrile copolymers.

The approximate maximum allowable mixing temperature of each resin and solvent mixture may readily be determined by mixing the resin and solvent at temperatures of −50° C. or lower. The temperature is then allowed to rise to about −40° C. and the mixture is again chilled to around −50° C. If there is no apparent increase in the viscosity of the mixture at the lower temperature, the mixture is allowed to warm up to progressively higher temperatures and subsequently is chilled to −50° C. after each desired temperature level has been reached, and the viscosity of the chilled mixture noted. There is an appreciable change in the low temperature viscosity of the solution after the allowable maximum mixing temperature has been exceeded. This facilitates the application of the principle of this invention of dispersing finely divided resin particles in a solvent therefor at temperatures below that at which rapid solvation of the resin occurs for any given resin-solvent mixture.

The following examples serve to illustrate the invention:

*Example I*

A quantity of a vinyl chloride-acrylonitrile copolymer resin containing around 54% of the chloride in the polymer and having a specific viscosity at 20° C. of 0.330 was mixed with enough acetone which had been chilled to −10° C. to yield a 20% solution, the solvent being maintained at −10° C. while the resin was mixed therewith. After about three minutes of agitation at that temperature, the mixture was warmed to room temperature while being kneaded, the heating being promoted by a stream of warm water surrounding the outside of the container. When the temperature of the mixture reached 5° C., the mixture had become noticeably more viscous. When the temperature reached 8° C. the mixture was approaching transparency. As the mixture approached room temperature it attained a rather high viscosity, as would be expected. Upon further increase of temperature to around 40° to 50° C., the solution became more fluid, and the bubbles therein were worked out by the mechanical kneading or agitation. The solution was then allowed to cool, yielding a clear, gel-free spinning dope. The heat treatment had been of such short duration, i. e., 10 minutes, that the resin solution was observed to be unusually light in color.

In contrast thereto, in a parallel operation in which the same quantity of the aforesaid vinyl resin was mixed with enough acetone at room temperature to yield a 20% solution, the resin agglomerated into lumps approximately one-quarter inch in diameter. These lumps were at first white in color, but gradually became transparent as they were penetrated by the acetone. They persisted as gel particles which could not be broken up by mechanical mixing even at elevated temperatures.

*Example II*

Twenty grams of acetone were cooled to −5° C. by means of a mixture of acetone and solid carbon dioxide. To the sub-zero acetone were added 15 grams of a vinyl resin produced by the conjoint polymerization of vinyl chloride and acrylonitrile and containing around 54% of the chloride in the polymer and having a specific viscosity at 20° C. of 0.330. The resultant mixture was then stirred for about three minutes at −5° C. This yielded a somewhat viscous mixture containing 43% of solids in the form of a slurry which was free from lumps and readily handled. After removing the mixture from the chilling bath, 65 grams of acetone at room temperature were added, thereby lowering the solids content to 15% and causing a temperature rise to 9° C. At this point the batch began to assume the typical appearance of a spinning solution at room temperature. However, the solution was free of lumps and gel particles and, after the air bubbles had been eliminated at temperatures slightly above room temperature, was indistinguishable from the solution prepared in Example I.

Efforts to produce a gel-free dispersion following the procedure of Example II with the exception that the acetone was originally cooled only to 0° C. were unsuccessful because of heavy lumping. This occurred even where the resin was very carefully screened before being added to the acetone.

*Example III*

To a body of acetone chilled to −5° C. was added a sufficient quantity of a vinyl resin in finely divided form to yield a 15% resin solution. The vinyl resin was produced by the conjoint polymerization of vinyl chloride and vinyl acetate. It contained around 91.2% of the chloride in the polymer, and had an average macromolecular weight of 26,200. After agitating the resultant slurry for a few minutes at the aforesaid sub-zero temperature, the slurry was gradually heated by means of a hot water bath. As the mixture reached 0° C. it began to thicken; at temperatures between 20° and 25° C. it began to lose its opacity; and it became entirely clear after a few minutes at 35° C. No gel particles or lumps were present. The total time required to make the solution was about thirty minutes.

In a parallel operation wherein the same amounts of acetone and the aforesaid vinyl resin at room temperature were mixed with agitation, the resin agglomerated into large rubbery lumps which were very difficult to tear apart. Thirty minutes at room temperature were required for the acetone to penetrate the lumps, which then became transparent but remained visible as gel particles. After heating the batch to 50° C. with agitation for another thirty minutes, gel particles were still visible.

*Example IV*

A sufficient quantity of finely divided particles of a vinyl resin was mixed with acetone that had been chilled to −40° C. to yield a resin solution containing approximately 16.9% of the resin, while maintaining the mixture at the aforesaid sub-zero temperature and agitating the mixture. The resin was produced by the conjoint polymerization of vinyl chloride and vinyl acetate; and it contained 88.0% of the chloride in the polymer and had an average macromolecular weight of around 9000. The resultant slurry was then warmed to raise the temperature to around room temperature. The mixture began to stiffen at about −20° C.; the opacity began to disappear slightly below 0° C.; and at temperatures between 10° and 15° C., a clear solution had been obtained entirely free of lumps and solid gel particles.

Another 16.9% solution of the same vinyl resin in acetone, prepared by mixing the resin and acetone with agitation while at room temperature, yielded a solution containing solid lumps of resin which were softer and easier to disintegrate than those of the resin described in Example III. After one hour, however, the resin solution still was not smooth and contained undissolved resin particles.

*Example V*

A sufficient quantity of the finely divided vinyl chloride-acrylonitrile copolymer resin containing 57.6% of vinyl chloride and having a specific viscosity of 20° C. of 0.389 was intimately mixed with nitroethane previously chilled to 5° C. to yield a 16% resin solution in the form of a smooth slurry. After agitation of the mixture for several minutes, it was heated to 25° C. It became appreciably more viscous at about 10° C. and began to lose its opacity at 25° C., and after a few minutes a clear, slightly opalescent, gel-free solution resulted.

Attempts to prepare a similar solution of the same resin starting with nitroethane that was at room temperature were unsuccessful. The vinyl resin sank immediately in the nitroethane and formed large lumps which were tough and rubbery. After about thirty minutes at room temperature the solvent had penetrated the lumps sufficiently to make them translucent, but they persisted for several hours as gel particles which could not be broken up with a stirring rod.

*Example VI*

Approximately 5 grams of a finely divided resinous copolymer of styrene and acrylonitrile containing 24.5% of the latter were intimately mixed with approximately 25 grams of acetone previously chilled to −5° C. The mixture was then heated to room temperature, yielding a solution entirely free from gel particles and having excellent texture. A similar solution prepared using acetone at room temperature was filled with lumps which were finally penetrated by the acetone in about ten minutes, but the resultant gel particles persisted for an hour.

*Example VII*

A quantity of finely divided after-chlorinated polyvinyl chloride containing 58.2% chlorine and having a macromolecular weight of 19,000 (calculated from the viscosity of a dilute solution in isophorone) was mixed with five times its weight of acetone previously chilled to 0° C. The mixture upon warming to room temperature yielded a smooth solution free from lumps and gel particles. A similar solution prepared using acetone at room temperature contained hard lumps which persisted, and were visible after three hours although they became transparent after about thirty minutes.

*Example VIII*

Approximately 5 grams of a finely divided vinyl chloride-vinyl acetate copolymer resin containing 90.5% of the chloride in the polymer and having a macromolecular weight of 26,000 was mixed with 25 grams of 1,4-dioxane cooled to 11.7° C. (the freezing point of the dioxane). Upon warming the resultant slurry to room temperature a gel free solution of the resin was produced. A similar mixture prepared using dioxane at room temperature gave a solution wherein the resin was agglomerated into rubbery lumps.

By the practice of the present invention it is now possible, in a simple and readily-controlled manner, to produce solutions of vinyl resins in solvents which have excellent wetting power for the vinyl resins but whose high solvent powers for the resin heretofore have interfered with their wetting action and caused lumping and gel formation. The invention involves a controlled repression of the solvent power of such resin solvents without substantially diminishing the power of the solvents to wet and penetrate the powdered vinyl resin, effected in the novel manner hereindescribed. The procedure provides the important advantage over prior processes for effecting solutions of these resins that the resin solutions are not contaminated with a non-solvent diluent.

As evidenced by the examples, the highest temperature allowable during the preliminary mixing of the resin and solvent at reduced temperatures varies with the solvent and resin employed. Thus, the greater solvent power of acetone for the particular vinyl resin used in Example IV than for that used in Example III makes necessary in Example IV the reduction of the temperature of the acetone during the first or chill-mixing stage somewhat below the maximum temperature permissible in Example III. Example V illustrates the need for chilling the volatile resin solvent to a lower temperature when employing acetone with a certain vinyl resin than when employing nitroethane for dissolving the same resin, due to differences in the solvent power and in the penetrating power of the respective solvents for that resin.

The invention has important utility for producing clear, spinnable solutions of vinyl resins free from solid or gel particles where for any reason it is undesirable to subject such resins to the heat treatments used in previous methods for preparing spinning solutions and the like. It also is useful where the tendency of non-solvents to precipitate the resin cannot be tolerated; or where complication of the solvent-recovery step caused by the introduction of foreign materials into the solvent system must be avoided. Resin solutions thus made likewise are useful in the production of fine films and slit films.

The present process appears of very practical importance for dissolving vinyl resins produced by present-day emulsion polymerization processes. In the present state of that art, emulsion-made resins are characterized by extremely fine particle size, and appear more susceptible to "lumping" during dissolution than the resins produced by the usual precipitation processes. This might be explained either as caused by surface phenomena or by possible electrostatic conditions in the powdered resin itself.

The expression "an acetone-soluble vinyl resin formed by the polymerization of not more than three vinyl monomers, each containing a single vinyl group" and similar expressions appearing in the claims are intended to refer to acetone-soluble resins formed by the polymerization of one such vinyl monomer, as well as those made by the copolymerization of two or three of such vinyl monomers.

The invention is susceptible of modification within the scope of the appended claims.

I claim:

1. Process for preparing a spinnable solution in a volatile solvent of an acetone-soluble vinyl resin formed by the polymerization of not more than three vinyl monomers, each containing a single vinyl group, said resin normally forming with such solvent solutions containing gel particles, while inhibiting the formation of solid gel particles and injury to the resin, which comprises mixing such a finely divided vinyl resin with said solvent while maintaining the resultant mixture at a temperature below that at which rapid solvation of the resin by the solvent occurs, thereby forming a slurry containing resin particles that have been penetrated but not dissolved by said solvent, and thereafter increasing the temperature of the mixture to at least 20° C. while agitating the mixture, thereby increasing the solvent capacity of the solvent for the resin and producing a resin solution substantially free from undissolved resin particles.

2. Process for preparing a spinnable solution in a volatile solvent of an acetone-soluble vinyl resin formed by the polymerization of not more than three vinyl monomers, each containing a single vinyl group, said resin normally forming with such volatile solvent solutions containing gel particles, while inhibiting the formation of solid gel particles and injury to the resin, which comprises intimately mixing such a finely divided vinyl resin with a body of such a solvent, maintaining the solvent at a temperature no higher than 0° C. during such mixing, thereby forming a slurry containing resin particles that have been penetrated but not dissolved by the solvent, and thereafter increasing the temperature to at least 20° C. while agitating the mixture, thereby increasing the solvent capacity of the solvent for the resin and producing a clear resin solution substantially free from undissolved resin particles.

3. Process as defined in claim 2 wherein said volatile solvent is a ketone.

4. Process as defined in claim 2 wherein the volatile solvent is acetone.

5. Process for preparing a spinnable solution in a volatile solvent of an acetone-soluble vinyl resin formed by the conjoint polymerization of a vinyl halide and a vinyl ester of an aliphatic acid, said resin containing at least 85% of the halide in the polymer and having a macromolecular weight of at least 15,000, while inhibiting the formation of solid gel particles and injury to the resin, which comprises intimately mixing such a finely divided vinyl resin with a body of such a solvent, and maintaining the solvent at a temperature no higher than −2° C. during such mixing, thereby forming a slurry containing resin particles that have been penetrated but not dissolved by the solvent, and thereafter increasing the temperature to at least 20° C. while agitating the mixture, thereby increasing the solvent capacity of the solvent for the resin and producing a clear resin solution substantially free from undissolved resin particles.

6. Process for preparing a spinnable solution in a volatile solvent of a vinyl resin formed by the conjoint polymerization of vinyl chloride and acrylonitrile, said resin containing from 45% to 80% of vinyl chloride and having a specific viscosity at 20° C. of at least 0.15, while inhibiting the formation of gel particles and injury to the resin, which comprises intimately mixing such a finely divided vinyl resin with a body of such a solvent, and maintaining the solvent at a temperature no higher than −2° C. during such mixing, thereby forming a slurry containing resin particles that have been penetrated but not dissolved by the solvent, and thereafter increasing the temperature to at least 20° C. while agitating the mixture, thereby increasing the solvent capacity of the solvent for the resin and producing a clear resin solution substantially free from undissolved resin particles.

7. Process for preparing a spinnable solution in a volatile solvent of an acetone-soluble vinyl resin formed by the polymerization of not more than three vinyl monomers, each containing a single vinyl group, said resin normally forming with such solvent solutions containing gel particles, while inhibiting the formation of solid gel particles and injury to the resin, which comprises intimately mixing such a finely divided vinyl resin with a body of said solvent while maintaining the solvent at a temperature below that at which appreciable softening or swelling of the resin by the solvent occurs, thereby forming a slurry containing resin particles that have been penetrated but not dissolved by the solvent, and thereafter raising the temperature of the mixture to around 50° C. while mechanically working said mixture, thereby producing a clear, homogeneous resin solution substantially free from undissolved resin particles and gas bubbles.

8. Process for preparing a spinnable solution of an acetone-soluble vinyl resin in a volatile solvent for such resin, said resin having been produced by the polymerization of not more than three vinyl monomers including a vinyl halide, no monomer containing more than one vinyl group, which comprises mixing the finely divided resin with a sufficient amount of said solvent to provide such solution, while maintaining the solvent and resin at a temperature no higher than −2° C., thereby forming a slurry containing resin particles that have been penetrated but not dissolved by said solvent, and thereafter increasing the temperature of the mixture to at least 20° C. while mechanically working the mixture, thereby increasing the solvent capacity of the solvent for the resin and producing a clear resin solution substantially free from undissolved resin particles.

9. Process for preparing a clear, homogeneous, spinnable composition substantially free from solid resin particles and gas bubbles and capable of being spun in the form of fine textile filaments, which comprises intimately mixing finely divided particles of an acetone-soluble vinyl resin resulting from the conjoint polymerization of not more than three vinyl monomers including a vinyl halide, each of said monomers containing a single vinyl group, and a sub-zero volatile solvent for said vinyl resin in amount sufficient to provide a resin solution containing between 7.5% and 30% of said resin, maintaining said solvent at a temperature no higher than −2° C. during such mixing operation, thereby forming a slurry containing resin particles that have been penetrated but not dissolved by the solvent, and thereafter warming such mixture to a temperature within the range between 20° C. and about 50° C. while mechanically working the mixture, thereby increasing the solvent capacity of the solvent for the resin and producing a clear resin solution substantially free from undissolved resin particles and from occluded gases and vapors.

10. Process of preventing the gelling of an acetone-soluble vinyl resin produced by the conjoint polymerization of two vinyl monomers including a vinyl halide, each of said monomers containing a single vinyl group, during dissolution of the resin in a volatile solvent therefor, which comprises mixing the finely divided vinyl resin with a body of the solvent, while maintaining the solvent at a temperature below that at which appreciable swelling of the resin by said solvent occurs, thereby wetting the resin particles with said solvent while inhibiting solvation of the resin by the solvent, and forming a slurry containing resin particles that have been penetrated but not dissolved by the solvent, and thereafter bringing the mixture to a temperature of at least 20° C. while agitating the mixture, thereby increasing the solvent capacity of the solvent for the resin and producing a resin solution substantially free from undissolved resin particles.

11. Process for preparing a spinnable solution in a volatile solvent of a vinyl resin normally forming with such solvent solutions containing gel particles, while inhibiting the formation of such gel particles and injury to the resin, which comprises intimately mixing with such a solvent a finely divided acetone-soluble vinyl resin produced by the polymerization of not more than three vinyl monomers including a vinyl halide, each of said monomers containing a single vinyl group, while maintaining the resultant mixture at a temperature below that at which rapid solvation of the resin by the solvent occurs, thereby forming a slurry containing resin particles that have been penetrated but not dissolved by said solvent, and thereafter increasing the temperature of the mixture to at least 20° C. while agitating the mixture, thereby increasing the solvent capacity of the solvent for the resin and producing a spinnable resin solution substantially free from undissolved resin particles.

GEORGE H. FREMON.